United States Patent [19]

Boecker et al.

[11] Patent Number: 4,775,393

[45] Date of Patent: * Oct. 4, 1988

[54] AUTOGENOUS ATTRITION GRINDING

[75] Inventors: Wolfgang D. G. Boecker; Tadeusz M. Korzekwa, both of Lewiston, N.Y.

[73] Assignee: The Standard Oil Company, Cleveland, Ohio

[*] Notice: The portion of the term of this patent subsequent to Sep. 22, 2004 has been disclaimed.

[21] Appl. No.: 868,954

[22] Filed: May 30, 1986

Related U.S. Application Data

[63] Continuation-in-part of Ser. No. 722,272, Apr. 11, 1985, Pat. No. 4,695,294.

[51] Int. Cl.$^4$ .............................. B24D 3/00
[52] U.S. Cl. ............................ 51/293; 51/308; 51/309
[58] Field of Search ............... 51/293, 308, 309

[56] References Cited

U.S. PATENT DOCUMENTS

| | | | |
|---|---|---|---|
| 3,075,710 | 1/1963 | Feld et al. | 241/16 |
| 3,231,203 | 1/1966 | Hardinge et al. | 241/24 |
| 3,268,177 | 8/1966 | McKibben | 51/163.2 |
| 3,311,310 | 3/1967 | Engels et al. | 241/153 |
| 3,485,608 | 12/1969 | Cecil | 51/308 |
| 3,521,825 | 7/1970 | Morcom | 241/26 |
| 3,715,083 | 2/1973 | Funk | 241/24 |
| 3,957,210 | 5/1976 | Durr | 241/46.02 |
| 4,123,286 | 10/1978 | Coppola et al. | 106/44 |
| 4,129,261 | 12/1978 | Engels et al. | 241/46.11 |
| 4,242,842 | 1/1981 | Yancey | 51/309 |
| 4,275,026 | 6/1981 | Hazel et al. | 264/67 |
| 4,544,376 | 10/1985 | Duran | 51/293 |
| 4,575,384 | 3/1986 | Licht et al. | 51/308 |

OTHER PUBLICATIONS

Bulletin 670 of the U.S. Dept. of Interior, "Communication by the Attrition Grinding Process", Stanczyk et al., U.S. Govt. Printing Office 1981-332-076.
"Disintegration of Particulate Solids by Wet Grinding", H. Durr, 1978, Draiswerke product bulletin.

*Primary Examiner*—Paul Lieberman
*Assistant Examiner*—Willie J. Thompson
*Attorney, Agent, or Firm*—Michael L. Dunn; Joseph G. Curatolo; Larry W. Evans

[57] ABSTRACT

A method for grinding silicon carbide to a submicron powder which comprises grinding a silicon carbide feed material having an average particle size of between 1 and 200 microns in a liquid slurry in a contamination free high energy autogenous attrition mill in the presence of silicon carbide media for a sufficient time to obtain a specific surface area of at least 5 $m^2/g$ and preferably at least 9 $m^2/g$. The media is of high purity and has an average particle size of less than 4 mm and preferably less than 2.5 mm. The ground material is then further treated so that the average particle size is less than one micron and so that greater than 97 numerical percent of the particles of the finished powder is smaller than 5 microns. The invention includes the finished powder.

23 Claims, 1 Drawing Sheet

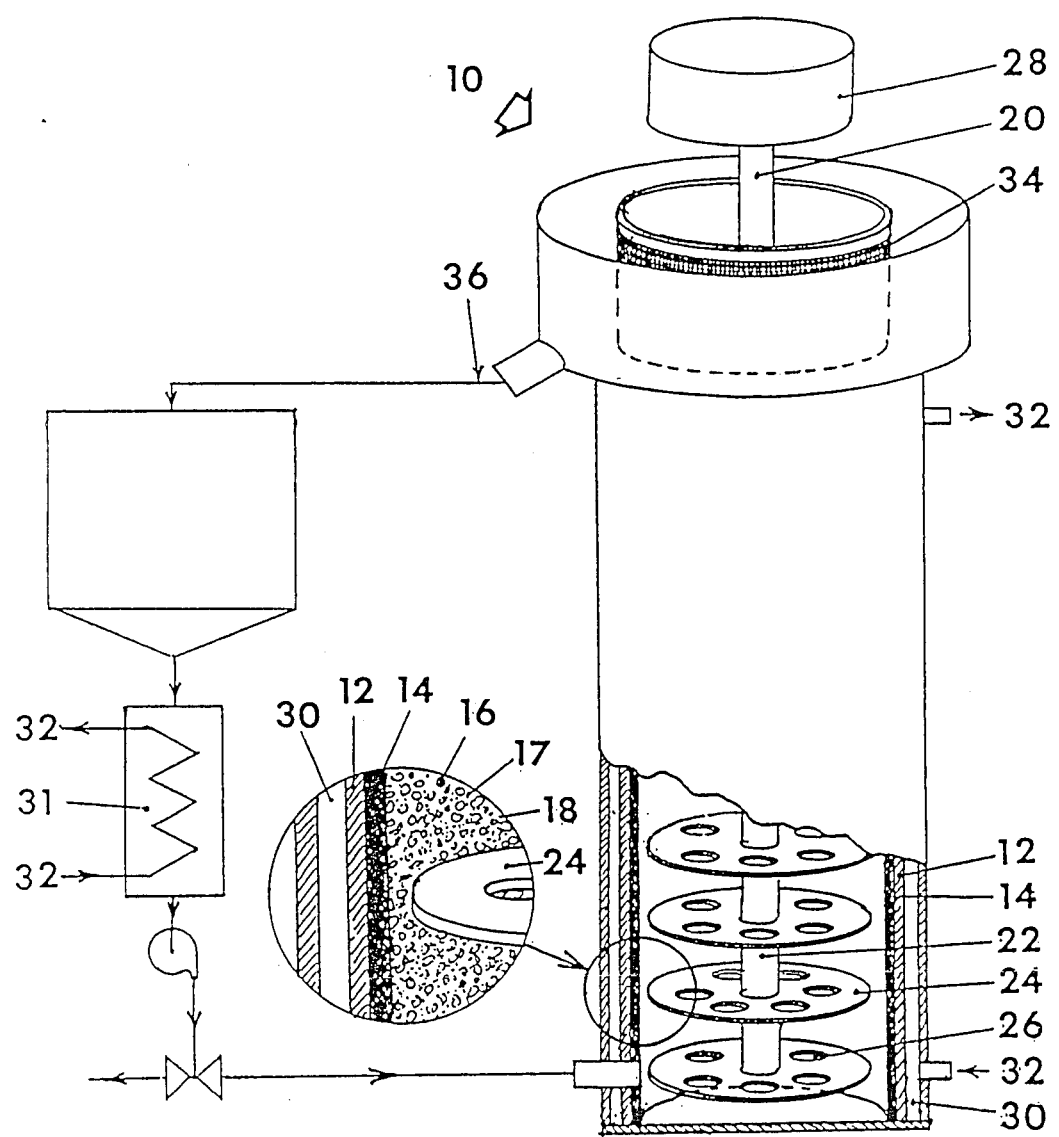

AUTOGENOUS ATTRITION GRINDING

This application is a continuation-in-part of copending patent application Ser. No. 722,272 filed Apr. 11, 1985, now U.S. Pat. No. 4,695,294.

BACKGROUND OF THE INVENTION (A) Field of the Invention

This invention relates to grinding methods and particularly relates to grinding of ceramic materials to ceramic powders. The invention especially relates to autogenous attrition grinding of such ceramic materials.

(B) History of the Prior Art

In the prior art there has been a need for high temperature ceramic materials, especially silicon carbide, in powdered form wherein the particle size of the powder is very small, i.e. submicron. Such ceramic powders, in submicron size, i.e. average particle size of less than one micron, are especially required for sintering operations wherein the powders are sintered into high temperature, high hardness ceramic articles. In the prior art, especially for materials having high hardness, e.g., in excess of nine on the Mohs scale, it was exceedingly difficult to obtain powders having particle sizes as small as desired. In order to obtain such powders, exceedingly long grinding times, often as long as days, were required. Furthermore, due to the hardness of the material, it was difficult to grind such materials without contamination resulting from the grinding media and container, e.g. iron. It was proposed, e.g. in U.S. Pat. No. 4,275,026, to grind ceramic materials such as titanium diboride in a mill having surfaces constructed of a non-contaminating material such as titanium diboride itself. When grinding media was used, it was usually a shaped media. The ground material had a broad particle size distribution with a large weight percent being in the larger particles. Surface areas indicate that the average particle size is usually not submicron even with long grinding times. An attrition mill is mentioned but there is no suggestion of high energy input in such a mill.

It has also been proposed, for example in U.S. Pat. No. 3,521,825, to actually introduce a second phase material in a milling process by including a milling media which provides the second phase material upon grinding in a milling jar. An attrition mill is not suggested for any purpose. This patent requires grinding media balls or pellets and involves slow milling processes. The milling time in the example in U.S. Pat. No. 3,521,825 is 72 hours.

Another method for avoiding contamination of product in such milling operations is by coating the walls of the container with an abrasion resistant material such as rubber or polyurethane which is satisfactory for slow grinding operations of the prior art.

It has further been proposed, for example in bulletin 670 of the United States Department of the Interior, U.S. Government Printing Office No. 1981-332-076, entitled "Comminution By The Attrition Grinding Process" by Stanczyk et al, that ceramic materials can be ground using the material itself as the grinding media in a higher energy process. The process as disclosed in Stanczyk et al, however, has serious shortcomings. In particular, it is generally disclosed that a grinding media such as silica sand is desirable. Furthermore, the process and equipment disclosed is neither coated with an abrasion resistant material nor coated with the material being ground. In addition, the reference generally does not disclose grinding energy input which provides an agitator tip speed any greater than 7.22 meters per second. Such an energy input still is not as high as desirable to obtain rapid grinding of the material. Furthermore, especially in grinding devices which are coated with an abrasion resistant surface such as rubber or polyurethane, heat which is developed during the grinding process simply cannot be removed rapidly enough through the wall of the device to prevent steaming and build-up of pressure during a wet grinding operation at higher energy input. Such autogenous mills have not been suggested for use to reduce a silicon carbide feed material to a surface area of at least 5 $m^2/g$ nor to an average particle size below 1 micron. Additionally, it had been believed that such grinding resulted in rounded particles. Rounded particles of narrow size distribution are usually not considered desirable for sintering operations due to poor compaction properties.

It is disclosed in copending patent application Ser. No. 722,272 that such powders can be ground in a vibro-energy or vibratory mill, i.e. a vibrational mill having high frequency and special media. Frequency is often between 750 and 1800 cpm. Such vibro-energy mill grinding, however, has serious disadvantages. In particular, high density packing of vibrationally ground silicon carbide is not obtained as easily as desired and vibratory grinding of silicon carbide introduces impurities, especially boron and aluminum, which are undersirable for certain applications, especially electronics. Such impurities result from sintering aids used in the manufacture of the grinding media and from impurities which naturally occur in black silicon carbide preferably used to make the media. In addition the media is difficult to manufacture and is expensive because submicron silicon carbide must be blended with sintering aids, shaped and sintered.

BRIEF DESCRIPTION OF THE INVENTION

Therefore, in accordance with the present invention, there is provided a method for grinding silicon carbide to a submicron powder which comprises grinding a silicon carbide feed material having an average particle size of between 1 and 200 microns in a slurry in a contamination free high energy autogenous attrition mill in the presence of silicon carbide media for a sufficient time to obtain a specific surface area of at least 5 $m^2/g$ and preferably at least 9 $m^2/g$. The media is readily available, is of high purity and has an average particle size of less than 4 mm and preferably less than 2.5 mm. The ground material is then further treated so that the average particle size is less than one micron and so that greater than 97 numerical percent of the particles of the finished powder is smaller than 5 microns.

The finished silicon carbide powder manufactured in accordance with the present invention, though difficult to physically describe with particularity, overcomes many serious disadvantages of prior art powders. In particular, the submicron powders of the present invention compact better than prior art silicon carbide powders, i.e. achieve maximum compaction at much lower pressures than prior art powders and are at least as pure as the starting feed powder, i.e. no impurities are added during the grinding method.

DETAILED DESCRIPTION OF THE INVENTION

In accordance with the present invention there is provided a process which overcomes essentially all disadvantages of the prior art concerning grinding of silicon carbide to powders having an average particle size of less than a micron. In particular, grinding times are generally shorter than those of the prior art due to the capability of putting higher agitation energy into the system. This is possible because heat transfer from the system is substantially improved in accordance with the present process. Furthermore, no special grinding media are required and in general the material itself may act as the grinding media producing ultra fine powders directly. The grinding media preferably has an average size of less than 2.5 mm and may simply be crushed high purity silicon carbide without formation into particular shapes. The media may in fact be the powder which is being ground. The media can be obtained simply by crushing Acheson (resistance furnaced) silicon carbide crystals which are readily available in large quantities. The media is therefore less than 5% of the cost of sintered silicon carbide media such as may be used in vibro-energy mills. As a result of shortened grinding times and the elimination of the requirement of special grinding media, cost of grinding is substantially reduced. In addition, contamination by grinding media and grinding container surfaces is essentially eliminated. The resulting powders may therefore be of very high purity, i.e. as pure as the starting material. When crystalline silicon carbide is used as both the grinding media and the material being ground, the powders may contain less than 800 ppm total metals, less than 100 ppm aluminum and less than 50 ppm and often less than 10 ppm boron. Furthermore, submicron powders made in accordance with the present invention, while difficult to describe with particularity, unexpectedly compact much easier than prior art submicron silicon carbide powders.

Liquids, commonly used in accordance with the present invention to suspend the material being ground, are water and organic liquids such as hexane. The liquid is usually water and the slurry usually contains from about 30 to about 65 weight percent solids.

To prevent abrasion, the agitator is usually coated with rubber or polyurethane in accordance with the present invention. Alternatively, the agitator may be manufactured from a material having the same composition as the ceramic being ground.

In general, in accordance with the present invention the ceramic material, prior to autogenous grinding in accordance with the present invention, is a particulate material having an average particle size of between one and 100 microns. In general, the ceramic material after autogenous grinding has an average particle size of less than a micron.

In general the peripheral speed of the agitator in accordance with the present invention is above 7.5 meters per second but is usually from about 10 to about 100 meters per second. At these peripheral speeds, i.e. high energy input, the grinding operation is usually between 2 and 12 hours residence time but is usually less than about ten hours even when relatively large initial particle sizes of material to be ground is used.

Desirably, the ratio of the inside diameter of the grinding container to the inside length of the grinding container is from about 1:2 to 1:10 and the walls of the container may be watercooled to further enhance heat transfer. Furthermore, an external heat exchanger may be used. The agitators are desirably discs assembled on a drive shaft oriented in any desirable position, e.g. such that the central axis of the container is proximate the center of the disc or off center to increase turbulence. The discs desirably are provided with holes which increase the effect of the agitation.

Referring to the drawing, which shows a cross-sectional view of a preferred embodiment of a grinding mill for use in accordance with the autogenous attrition grinding method in accordance with the present invention, a mill 10 is provided with a cylindrical grinding container 12 comprising sidewalls 14 coated with an abrasive resistant material such as polyurethane or natural or synthetic rubber. Mill 10 contains high purity silicon carbide media 16 of a grit size of number 8 or number 10 or smaller. Feed material 17 in general having a particle size of between 1 and 100 microns, is also present in Mill 10. Feed material 17 is suspended in a liquid 18. Mill 10 is provided with an agitator 20 which comprises a drive shaft 22 to which are secured discs 24. Discs 24 generally contain holes 26 therethrough to increase the effect of the agitation. A drive means 28, usually in the form of an electric motor, is provided to turn drive shaft 22. In general, drive means 28 provides sufficient power and speed to turn drive shaft 22 at a speed which permits a peripheral speed of the agitator in the range of from about 10 to about 100 meters per second. Container 12 is generally of a cylindrical shape. Sidewalls 14 of container 12 are generally provided with a cooling jacket 30 through which cooling water 32 passes to remove heat resulting from the grinding operation or alternatively an external heat exchanger 31 is provided to cool the suspension (slurry) by pumping the slurry through exchanger 31. The top of container or chamber 12 is provided with a screen 34 which retains media in mill 10 and allows slurry containing ground fine powder 36 to leave the mill on a continuous basis. The screen size is anywhere from five to 100 microns depending upon the product requirements. Drive shaft 22 and attached discs 24 may or may not be made of the same material as is being ground but are usually coated with an abrasion resistant material such as rubber or polyurethane.

It has been found that subsequent to grinding in the autogenous mill the powder still contains a significant quantity, i.e. usually between 4 and 10 percent, of particles larger than 5 microns. Even extended grinding times do not completely eliminate these large particles.

In accordance with the present invention it has been found that these larger particles interfere with sintering operations and in accordance with the invention must be significantly reduced or eliminated by further treatment. Such further treatment results in a silicon carbide powder wherein greater than 97, and preferably greater than 98.5, numerical percent of the particles is smaller than 5 microns. In addition, after such further treatment the finished powder desirably has an average particle size of 0.5 to 0.9 microns.

Such further treatment may include elimination by selectively grinding the larger particles to a smaller size by a suitable different milling operation such as vibratory grinding as described in copending patent application Ser. No. 722,272, filed Apr. 11, 1985. In such a grinding method, the powder is vibrated with sintered silicon carbide pellets. The pellets usually have a maximum dimension of from about 0.5 to 5 centimeters and the diameter of the cylinder is from 0.3 to 4 times the length of the cylinder.

The larger particles may also be eliminated, for example, by separation by sedimentation or centrifuging techniques known to those skilled in the art.

The resulting submicron silicon carbide powder has unexpected and useful properties, especially in sintering operations. The powder may be of higher purity than prior art powders, e.g. may contain less than 800 ppm total metal impurity, less than 100 ppm aluminum and less than 10 ppm boron, since there is little or no contamination from the grinding and milling operation as commonly occurred with prior art methods.

In particular, metal media is not used, thus iron impurities are not introduced. In the first grinding step, sintered media is not used, thus aluminum or boron impurities, which are commonly used as sintering aids to fabricate the grinding media, are not introduced. Furthermore, even when vibratory grinding with sintered silicon carbide media is used as a finishing step, little contamination is introduced when compared with powder obtained completely by such vibratory grinding. This is true because the finishing step to eliminate particles having a size of over 5 microns takes only about 2 to 8 hours; whereas, completely forming the submicron powder by vibratory grinding usually takes more than 30 hours, typically 36 to 48 hours.

Furthermore, the attrition ground powder unexpectedly compacts to a high density more easily than prior art powders. This is desirable to more easily obtain high density sintered products with less shrinkage during sintering.

The property of superior compaction is especially unexpected because the prior art considered autogenously ground material to become rounded and rounded material having a narrow size distribution is known not to pack tightly. It is believed that, while not wishing to be bound by any particular theory, submicron silicon carbide powder which is at least 90% formed by autogenous attrition grinding, is not rounded, but in fact is irregular in shape. The powder of the present invention usually has a packing density of greater than 1.84 g/cc and preferably greater than 1.86 g/cc at 15,000 psi in the presence of 3.4% polyethylene glycol 200. The powder of the present invention may be treated with acid, usually HF, to remove excess oxygen, especially when present in the form of silica. The acid treatment may occur during the grinding or further treating steps to obtain the appropriate particle shape and size or may occur subsequent to such steps. When such acid treatment occurs during grinding, the liquid is an aqueous solution of HF in sufficient concentration to result in a pH of from 3 to 4. The most preferred pH is about 3.5.

The following examples serve to illustrate and not limit the present invention.

EXAMPLES

Various samples of silicon carbide made in an Acheson electrical resistance furnace are crushed, analyzed to meet the chemistry specification and milled to pass a 325 mesh screen.

The resulting silicon carbide powder is mixed with water to about 25% solids by weight, passed over a wet magnetic drum (to remove most of the magnetics, e.g. iron) and passed through a flotation cell (with the addition of pine oil as a frothing agent to remove most of the graphite). The slurry is collected in a dewatering tank where the powder is allowed to settle overnight and most of the water is decanted bringing the slurry density to over 50% solids.

An attrition mill system essentially as shown in the drawings is used. Specifications of the mill are shown in Table I. The system consists of a feed tank (65 gallon), an attrition mill (33 gallons), chamber dimensions of 14.5 inches in diameter and 46½ inches in length, a heat exchanger, a transfer (surge) tank (65 gallons) and pumps. About 50 gallons of dewatered slurry is transferred to the feed tank from a feed preparation area. The slurry density is adjusted to 40-50% solids by weight with water. The pH value is adjusted to within 8-9 and the viscosity is adjusted to below 50 cps with ammonia. Initially, the mill is filled with 12 mesh green SiC grit as media. The starting level of media in the mill is 26" measured from the top of a retaining screen in the mill. The media is continuously consumed and only make-up media is added in the form of 12 mesh grit. The grinding is effected by pumping the slurry into the mill at a rate of 1.5 to 2 gallons per minute (to maintain the temperature in the mill at 54° to 62° C.) while the polyurethane coated disks mounted on a shaft rotate at 750 rpm at a peripheral speed of 10.6 m/second. The temperature limitation is to minimize the wear of the polyurethane coatings of the mill. The grinding continues until the desired average particle size is usually between 0.9 to 1.0 microns. Particle size analysis can be accomplished by any reliable means known to those skilled in the art. One such desirable method is by liquid phase dispersive sedimentation wherein the measurement is taken by transmission. This method is referred to herein as the sedimentive-optical method. The slurry leaving the mill is passed through a 100 mesh screen and is pumped through a heat exchanger and back into the same tank. When required fineness (usually 0.89 to 0.95 microns) is achieved, the slurry is rerouted into the surge tank and held there for $HF/HNO_3$ treatment. Acid treated, washed and dewatered slurry is then subsequently ground in a vibratory mill as previously described with the main objective of grinding coarse particles, i.e. above 5 microns. There is a further decrease in the average particle size to about 0.7 to 0.85 microns with a corresponding specific surface area of 11 to 13 $m^2g$. Specifications of the attrition mill and operating conditions for the examples are shown in Table I.

TABLE I

| MILL DATA | | | |
|---|---|---|---|
| Motor: | 3 phase, 440/480 V, 60 cycles, 70 HP, 1800 RPM | | |
| Grinding Chamber: | Capacity: | 125 liters, 14½ inch diameter, 46½ inch length | |
| | Slurry capacity: | 40 liters (10.7 gal.) | |
| | Media capacity: | 190 kg SiC (#12 grit) | |
| | Lining: | 8 mm thick polyurethane | |
| Mill Shaft: | RPM 750 with sleeves polyurethane coated | | |
| Shaft Discs: | Polyurethane coated, diameter 10⅝ inches, tip speed 10.6 m/sec. | | |
| OPERATING CONDITIONS | | Operating Range | Controlled by |
| Slurry Temperature, °C. | | 54–62 | (a) heat exchanger and mill cooling jacket (b) flow rate of slurry through the mill |
| Slurry Flow Rate, gal/min | | 1.5–2 | pump setting |
| Mill Amperes | | 36–42 | primarily the quantity of media in the mill and |
| pH of the Slurry | | 8–9 | addition of ammonia to the slurry |
| Slurry viscosity, centipoise | | 50 max. | addition of ammonia or water to the slurry |
| % solids of the Slurry | | 40–50 | addition of filtered water |

TABLE I-continued

| | | |
|---|---|---|
| Grinding Time, hours | variable–usually 5-8 | to average particle size of <1 micron by sedimentive-optical analysis |
| Batch Size, pounds | 275-325 slurry | powder or 50-55 gal. |
| SiC media addition, lbs/hr | 4 | dipstick (26" below the screen) or amperage (below 38 Amps) |
| SiC media, particle size, mesh | 12, 14 or 16 | reused in next run |
| Slurry recirculation | slurry is pumped into the mill from the bottom of feed tank, then screened at 100 mesh and fine fraction pumped back through the heat exchanger into the same feed tank | |

Subsequent to grinding in the attrition mill, various samples were further ground in a vibratory mill, as previously described, to reduce the percentage of particles having a size of over 4 microns.

Prior to or after grinding, certain additives were blended into the powder for various purposes. Such additives include sintering aids, binders and defoamers. In each of the following comparative cases, the same percentages of identical additives were added at the same time during processing. 3.4% polyethylene glycol 200 was incorporated as a lubricant prior to compacting.

For purposes of comparison, various submicron green silicon carbide powders were compacted under the same conditions. All samples had a specific surface area of between 10 and 12 m²/g. The samples were compacted in a mold cavity having a diameter of about 0.65 inches (1.65 cm) and a depth of about 0.63 inches (1.6 cm). The pressure was applied by a plunger entering the top of the cavity.

Results of the comparative compaction studies are shown in Table II.

Pressures shown are in pounds per square inch. Some of the figures at particular densities were determined by extrapolation.

Sample A is an attrition ground sample in accordance with the invention. A starting material of −325 mesh was attrition ground for 8-9 hours.

Sample B is the same as Sample A except that the sample is further treated by vibratory grinding for 4 hours as previously described.

Sample C is manufactured by vibro-energy grinding as previously described. The starting material was −1200 mesh obtained by sedimentation from milling of Acheson green silicon carbide. The vibro-energy grinding time was about 21 hours.

Sample D was ball milled Acheson green silicon carbide followed by sedimentation to obtain the submicron fraction.

These results clearly show that the powders of the present invention have better compaction properties than the powders which were primarily vibrationally ground or ball milled silicon carbide powders.

TABLE II

| Green Density | | Compaction Pressure, psi | | | |
|---|---|---|---|---|---|
| g/cc | % Theoretical | Sample A Attrition only | Sample B Attrition & Vibratory | Sample C Vibratory only | Sample D Ball Mill |
| 1.61 | 50 | 2,400 | 2,500 | 3,900 | 4,300 |
| 1.67 | 52 | 3,200 | 3,400 | 5,500 | 6,600 |
| 1.73 | 54 | 4,700 | 4,700 | 8,100 | 9,200 |
| 1.80 | 56 | 7,500 | 7,600 | 13,300 | 15,900 |
| 1.86 | 58 | 13,600 | 14,000 | 24,300 | 30,000 |
| 1.93 | 60 | 25,000 | >25,000 | >25,000 | >30,000 |

What is claimed is:

1. A method which comprises
   (a) grinding a silicon carbide feed material having an average particle size of between 1 and 200 microns in a liquid slurry in a contamination free high energy autogenous attrition mill in the presence of silicon carbide media for a sufficient time to obtain a specific surface area of at least 5 m²/g, said media being of high purity and having an average particle size of less than 4 mm, and
   (b) further treating the resulting ground material so that the average particle size is less than 1 micron and so that greater than 97 numerical percent of the particles of the finished powder is smaller than 5 microns.

2. The method of claim 1 wherein in step (a) at least 90 numerical percent of the powder particles is reduced to a size below one micron and the feed material and media are the same.

3. The method of claim 1 wherein the treating in step (b) results in greater than 98.5 numerical percent of the powder particles being smaller than 5 microns.

4. The method of claim 1 wherein the ground material from step (a) is further treated by vibratory grinding to further grind the larger particles of the material.

5. The method of claim 4 wherein the vibratory grinding occurs for from 2 to 8 hours in a vibrational mill containing silicon carbide cylindrical pellets, said pellets having a maximum dimension of from about 0.5 to 5 centimeters and wherein the diameter of the cylinder is from 0.3 to 4 times the length of the cylinder.

6. The method of claim 1 wherein the ground material from step (a) is further treated by sedimentation from a liquid to remove larger size particles.

7. The method of claim 1 wherein the finished powder has an average particle size of from 0.5 to 0.9 microns.

8. The method of claim 1 wherein the internal surface of the mill and agitator within the mill are coated with an abrasion resistant material selected from polyurethane, natural rubber and synthetic rubber.

9. The method of claim 1 wherein the liquid is water and the slurry contains from about 30 to about 65 weight percent solids.

10. The method of claim 1 wherein the grinding occurs for from 2 to 10 hours.

11. The method of claim 1 wherein heat developed during grinding is removed by circulating the slurry through a heat exchanger.

12. The method of claim 8 wherein the tip speed of the agitator is above 7.5 meters per second.

13. The method of claim 1 wherein the feed powder contains less than 800 ppm metal impurities.

14. The method of claim 1 wherein the liquid comprises water.

15. The method of claim 14 wherein the liquid comprises HF in a sufficient concentration to result in a pH of from 3 to 4.

16. A silicon carbide powder having an average particle size smaller than 1 micron, greater than 97 numerical percent of the particle being smaller than 5 microns, a surface area greater than 9 $m^2/g$, and a packing density of greater than 1.84 g/cc at 15,000 psi in the presence of 3.4% polyethylene glycol 200.

17. The powder of claim 1 wherein the finished silicon carbide powder is at least as pure as the silicon carbide feed powder.

18. The finished silicon carbide powder manufactured in accordance with the method of claim 17 wherein the finished powder contains less than 800 ppm metal impurities.

19. The powder of claim 16 wherein the packing density is greater than 1.86 g/cc at 15,000 psi in the presence of 3.4% polyethylene glycol 200.

20. The finished powder of claim 18 wherein the powder contains less than 10 ppm boron and less than 100 ppm aluminum.

21. The powder of claim 16 wherein the powder has a surface area greater than 10 $m^2/g$.

22. The powder of claim 21 wherein the powder has a surface area between 11 and 13 $m^2/g$.

23. The powder of claim 16 wherein the compaction, at 15,000 psi in 3.4% polyethylene glycol 200, is greater than 1.86 g/cc.

* * * * *